United States Patent [19]

Malone

[11] Patent Number: 4,661,365

[45] Date of Patent: Apr. 28, 1987

[54] APPARATUS AND METHOD FOR PREPARING FEED GRAIN

[75] Inventor: Thomas J. Malone, Lubbock, Tex.

[73] Assignee: Nutri-Developers, Inc., Lubbock, Tex.

[21] Appl. No.: 589,695

[22] Filed: Mar. 13, 1984

Related U.S. Application Data

[62] Division of Ser. No. 491,856, May 3, 1983, Pat. No. 4,508,029.

[51] Int. Cl.$^4$ .............................................. A23K 1/00
[52] U.S. Cl. .................................. 426/507; 426/511; 426/481; 426/518
[58] Field of Search .............................. 426/506–507, 426/511, 481–483, 518; 99/471, 516, 483, 520; 241/6, 7, 135, 142

[56] References Cited

U.S. PATENT DOCUMENTS

| | | | |
|---|---|---|---|
| 227,626 | 5/1980 | Heston et al. | 241/135 |
| 422,223 | 2/1890 | Jones et al. | 241/142 X |
| 594,972 | 12/1897 | Smith et al. | 241/142 |
| 911,408 | 2/1909 | Jensen | 99/471 |
| 1,185,622 | 6/1916 | Boss | 426/511 |
| 1,574,210 | 2/1926 | Spaulding | 426/511 X |
| 1,679,099 | 7/1928 | Smith | 426/507 |
| 1,972,666 | 9/1934 | Pays | 241/142 X |
| 2,753,908 | 7/1956 | Anderson | 241/135 X |
| 3,385,528 | 5/1968 | Schaus | 426/507 |
| 3,962,479 | 6/1976 | Coldren | 426/532 |
| 4,080,475 | 3/1978 | Whelan | 426/518 X |

*Primary Examiner*—R. B. Penland
*Attorney, Agent, or Firm*—Mason, Fenwick & Lawrence

[57] ABSTRACT

A grain scratcher-moisturizer apparatus has an outlet connected by a screw conveyor to the infeed of a stream flaker assembly to provide substantial savings in the cost of treating feed grain. The scratcher-moisturizer has two driven parallel horizontal cylindrical rolls having closely spaced spiral grooves in their surfaces for receiving the base of a saw blade so that the teeth of the blade extend outwardly and are canted in the direction of rotation of the roll. Individual pivotal metal deflectors are mounted adjacent a respective cylindrical roll and grain is fed onto the driven rolls which hurl it against the deflector which deflect the grain back toward the roll. Each deflector is pivotally mounted for adjustment toward or away from its associated roll and is of zig-zag shape as viewed from its end so that it presents a series of approximately perpendicular flat areas equal the length of and facing its respective roll with each flat area being approximately perpendicular to a separate tangent from the roll so that the grain reverberates between the roll and deflector as it passes downwardly through the apparatus. A liquid spray pipe applies moisture to the scratched grain prior to entry of the grain into the screw conveyor.

14 Claims, 7 Drawing Figures

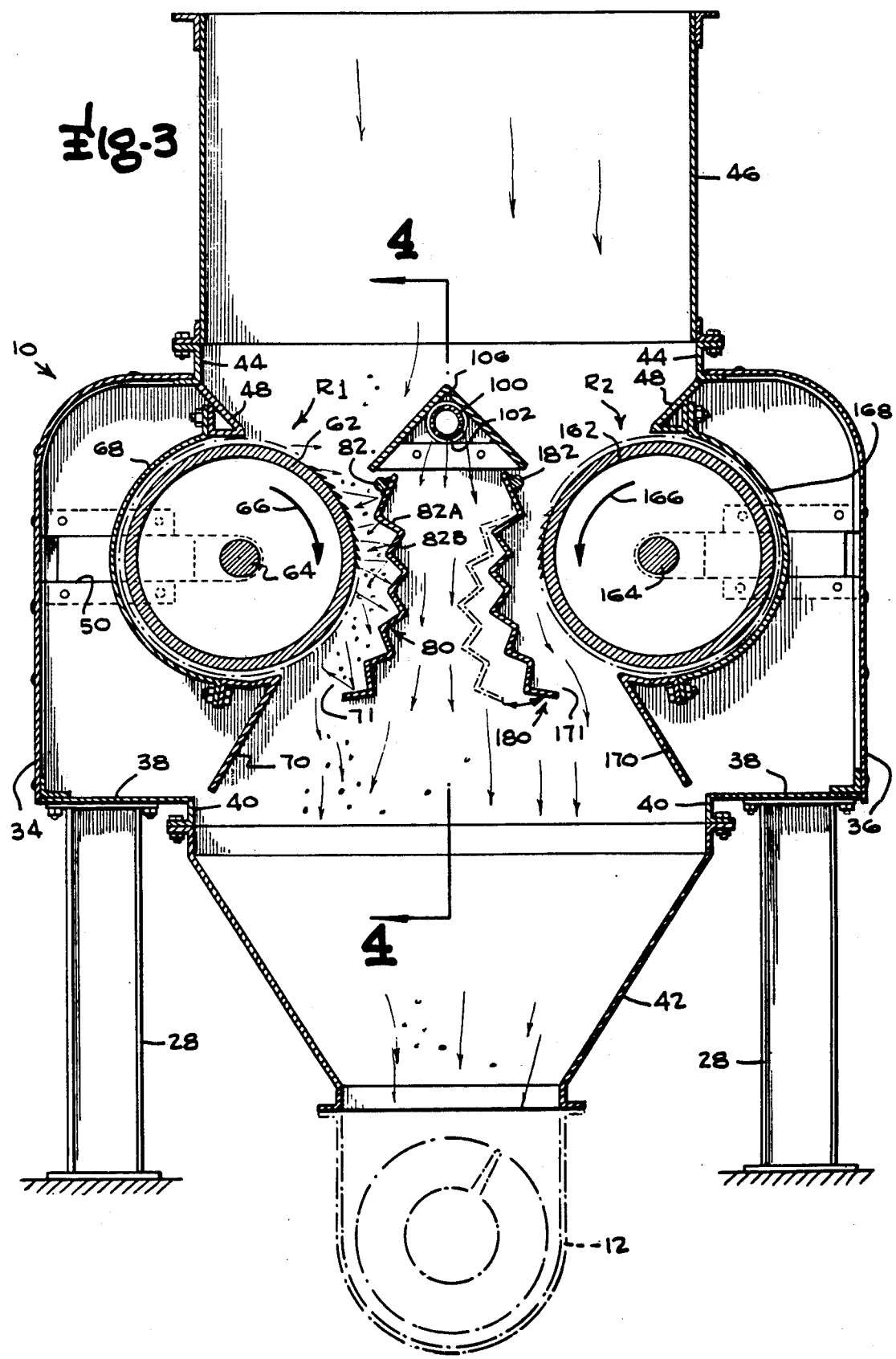

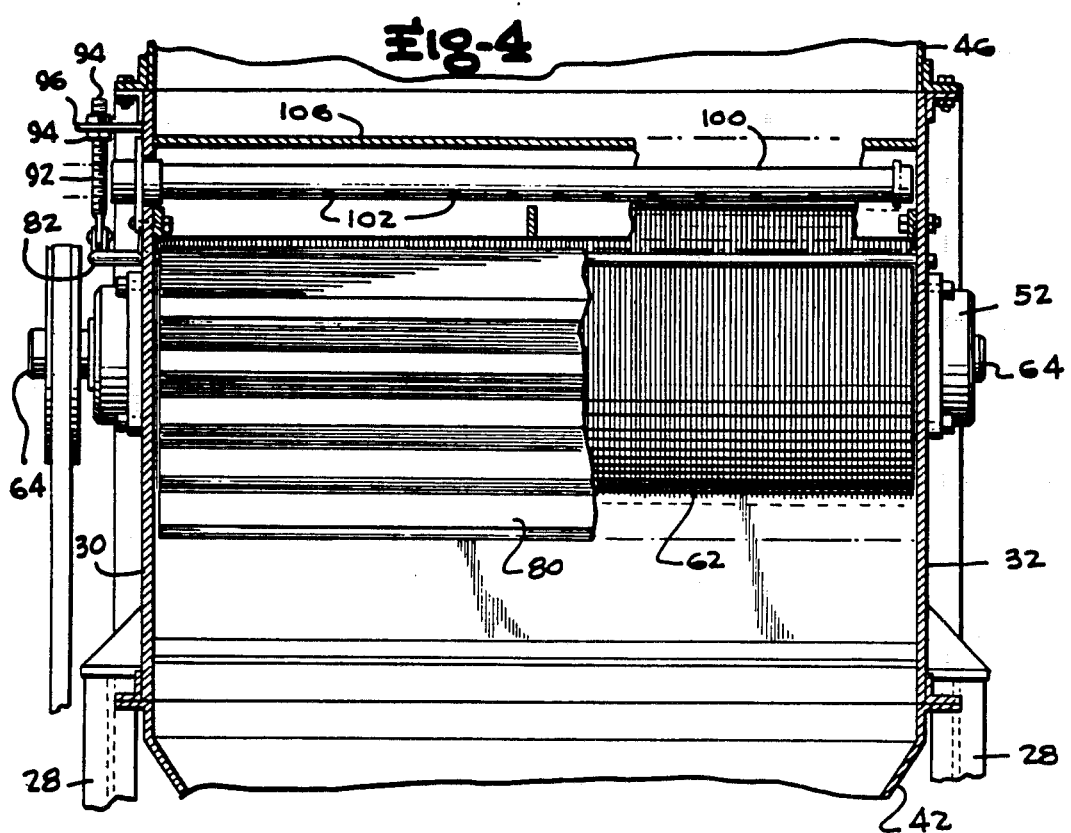
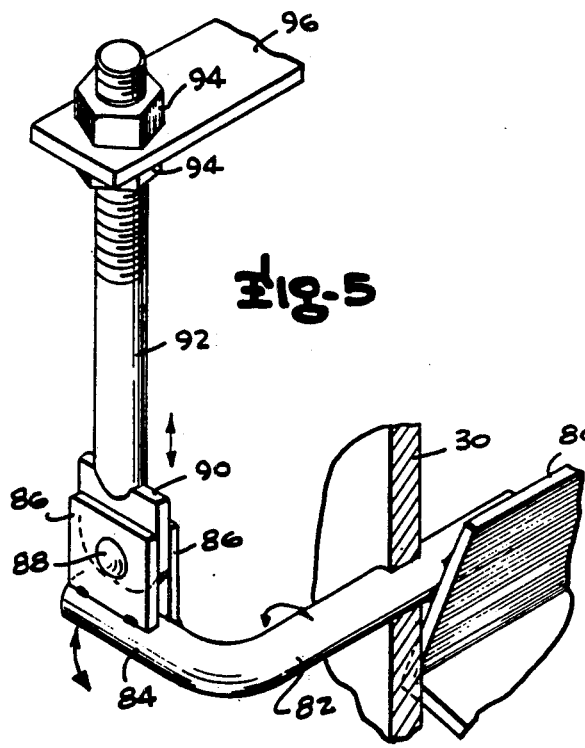
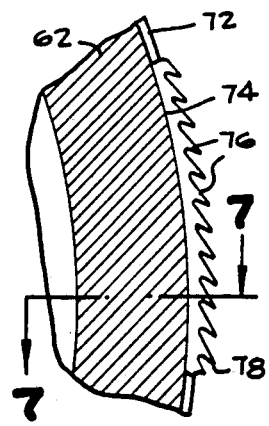
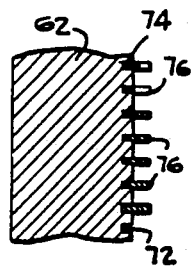

APPARATUS AND METHOD FOR PREPARING FEED GRAIN

This is a division of application Ser. No. 491,856, filed May 3, 1983 U.S. Pat. No. 4,508,029.

BACKGROUND OF THE INVENTION

The present invention is in the field of grain treatment devices and methods and is more specifically directed to a unique method and apparatus for effecting the moisturization and flaking of feed grain.

Cattle are normally fattened for slaughter in feed lots in which they are fed large quantities of grain over a period of several weeks. In past years, the grain would usually be plain untreated corn. However, grain sorghum, also known as milo, has achieved ever increasing popularity as a feed grain and is presently second only to corn for that purpose. In fact, grain sorghum is the number one feed grain in Texas, the leading cattle slaughtering state. It has long been recognized that the efficiency with which cattle can convert grain into weight gain can be enhanced by treating the grain prior to feeding. Many feed lots have a capacity for more than 50,000 head with the average grain consumption per day being approximately 20 pounds per head so that 50,000 head would consume 1,000,000 pounds (500 tons) of grain per day. Consequently, even minute increases in feed efficiency will result in substantial dollar savings.

A number of processes have consequently evolved for treating feed grain to increase the digestive efficiency of the grain. The first established processes were grinding and dry rolling. The cost of these methods is $1.50 to $2.00 per ton, but efficiency of feed utilization was poor which stimulated the search for improved processing methods. Milo has a waxy coat which is impervious to moisture and in addition, research has shown that the starch granules are surrounded by a protein matrix which greatly reduces the digestibility of the starch (primary energy source in grain). Any processing method which will break down the seed coat and/or the protein matrix surrounding the starch granules will improve the availability and utilization of the starch to meet the energy needs of cattle.

The greatest increase in digestive efficiency has been obtained by the steam flaking process in which feed grain (milo and corn) is subjected to steam in a closed housing at atmospheric pressure for a period of 30 to 40 minutes during which time the grain absorbs moisture from the steam. The grain is then fed between pressure rollers to provide very thin flakes usually containing 16% to 19% moisture and providing a 12% to 14% improvement over dry rolling or grinding in digestive efficiency. The improved digestive efficiency achieved by this process is resultant from the fact that the moisturization and flaking gelatinizes (solubilizes) some of the starch granules of the grain so as to render them more digestible. Unfortunately, the waxy coat surrounding the grain is such that oftentimes it is difficult to obtain rapid penetration of moisture into the grain using the normal procedure of steam flaking. Thus, the time and energy required for this method can become extremely expensive. Pressure flaking is a related process similar to steam flaking with the exception of the fact that the grain is treated under steam pressure at approximately 300° F. prior to the rolling operation; however, the pressure flaking process is more expensive in terms of power consumption with the results being equivalent to that achieved by non-pressurized steam flaking. Various other processes such as extruding, roasting, popping, exploding, micronizing, and reconstitution have also been employed for the treatment of feed grain in an effort to achieve improved digestive efficiency.

Another well-known grain treatment process is referred to as reconstitution and comprises the air-tight storage of high moisture content grain for 21 to 30 days following which the grain is rolled or ground to provide an increase in digestive efficiency approximately equal that achieved by steam flaking. However, the time required and grain storage costs have been limiting factors to the adaptation of this grain processing method. Thus, any technique which will reduce the time required for processing grain will greatly reduce the cost and make this a feasible method of grain processing.

Prior U.S. Pat. No. 3,962,479 is directed to an apparatus in which grain is first moistened and then subjected to a scratching of its husk for perforating the shells or husks to permit the moisture content of the grain to be increased. The device of this patent has been used for treating grain prior to the reconstitution process. The patent device incorporates a vertical shaft on which a plurality of cone-shaped scarifying rotors are provided. Unfortunately, the device becomes easily unbalanced so as to cause vibration frequently resulting in mechanical failure. Also, other mechanical failures occur as a consequence of water getting in the lower bearing supporting the vertical shaft causing failure of the bearing so that mechanical breakdowns are frequently resultant. Moreover, the device of this patent is relatively large and occupies a substantial amount of space so as to render its use impossible in locations having low ceilings or other similar space restrictions. Other grain treatment devices are shown in U.S. Pat. Nos. 1,439,379; 1,740,892; 3,717,480; and 3,754,929.

Thus, it is the primary object of the present invention to provide a new and improved method and apparatus for treating feed grain.

SUMMARY OF THE INVENTION

Achievement of the foregoing object is enabled by the preferred embodiment of the invention through the use of a new and improved grain scratcher-moisturizer apparatus for pre-treating grain prior to the feeding of the grain to a conventional steam flaking unit. While there is no increase in digestive efficiency, there is marked improvement in cost efficiency as a consequence of a faster flow of grain through the system which permits a reduction in the power cost for treatment from the approximate $5.50 per ton cost of operating a conventional steam flaker to approximately $3.30 per ton so as to achieve a 40% cost reduction. A feed lot having 50,000 head of cattle would consequently achieve a daily savings of $1,100.00 in power costs.

The scratcher-moisturizer employs two driven horizontal cylinder rolls from the periphery of which a plurality of canted V-shaped teeth extend in closely spaced spirals over substantially the entire length of the cylinder. The cylinder rolls are drivingly rotated and milo or other grain is fed onto the rolls to strike the teeth on the rolls to consequently scarify or scratch the pericarp (waxy seed coat) of the grain exposing the starch which will then readily absorb moisture. The scratching does not go deeper than the pericarp. The grain is hurled from the teeth toward a deflector means which it strikes and immediately bounces back into contact with the teeth of the roll for further scarifying. The foregoing process is repeated several times as the grain moves along a path between the deflector means and the roll for eventual discharge downwardly into a discharge hopper in which a liquid spray is applied to the grain. Thus, the grain in effect reverberates between the cylinder rolls and the deflector plates as it passes between these two elements and most of the grain contacts the teeth of the roll several times to be effectively scarified so as to render it susceptible to the subsequent absorption of further moisture.

The grain is then fed into a steam flaking apparatus where it is subjected to steam at atmospheric pressure for up to approximately 15 to 20 minutes and is then discharged downwardly between pressure rolls to provide the final product. It has been found that the foregoing combination permits the treatment of the grain at a cost reduction of 40% as compared to prior known steam flaking methods and apparatus.

In practice, two of the cylinders and two of the deflector members are employed in the preferred embodiment; however, one cylinder roll can be deactivated for maintenance or any other reason with the machine still being operable using the other roll. The deflector members are formed of a unitarily formed piece of metal which is bent in a zig-zag manner to define a plurality of elongated planar surfaces extending for a length approximately the same as the length of the cylinder roll with each surface being approximately perpendicular to a tangent from the cylinder. The foregoing zig-zag configuration results in the reverberation back and forth of the grain between the deflector plates and the cylinder rolls as the grain passes downwardly through the apparatus.

A better understanding of the invention will be achieved when the following detailed description is considered in conjunction with the accompanying drawings in which the same reference numerals are used in the different figures for illustrating the same parts.

BRIEF DESCRIPTION OF THE DRAWING

FIG. 3 is a sectional view taken along lines 3—3 of FIG. 2;

FIG. 4 is a sectional view taken along lines 4—4 of FIG. 3;

FIG. 5 is a perspective view of grain deflector adjustment means of the preferred embodiment;

FIG. 6 is an enlarged transverse section of a portion of cylinder shell means of the preferred embodiment; and FIG. 7 is a sectional view taken along lines 7—7 of FIG. 6.

DESCRIPTION OF THE PREFERRED EMBODIMENT

Figure 1:
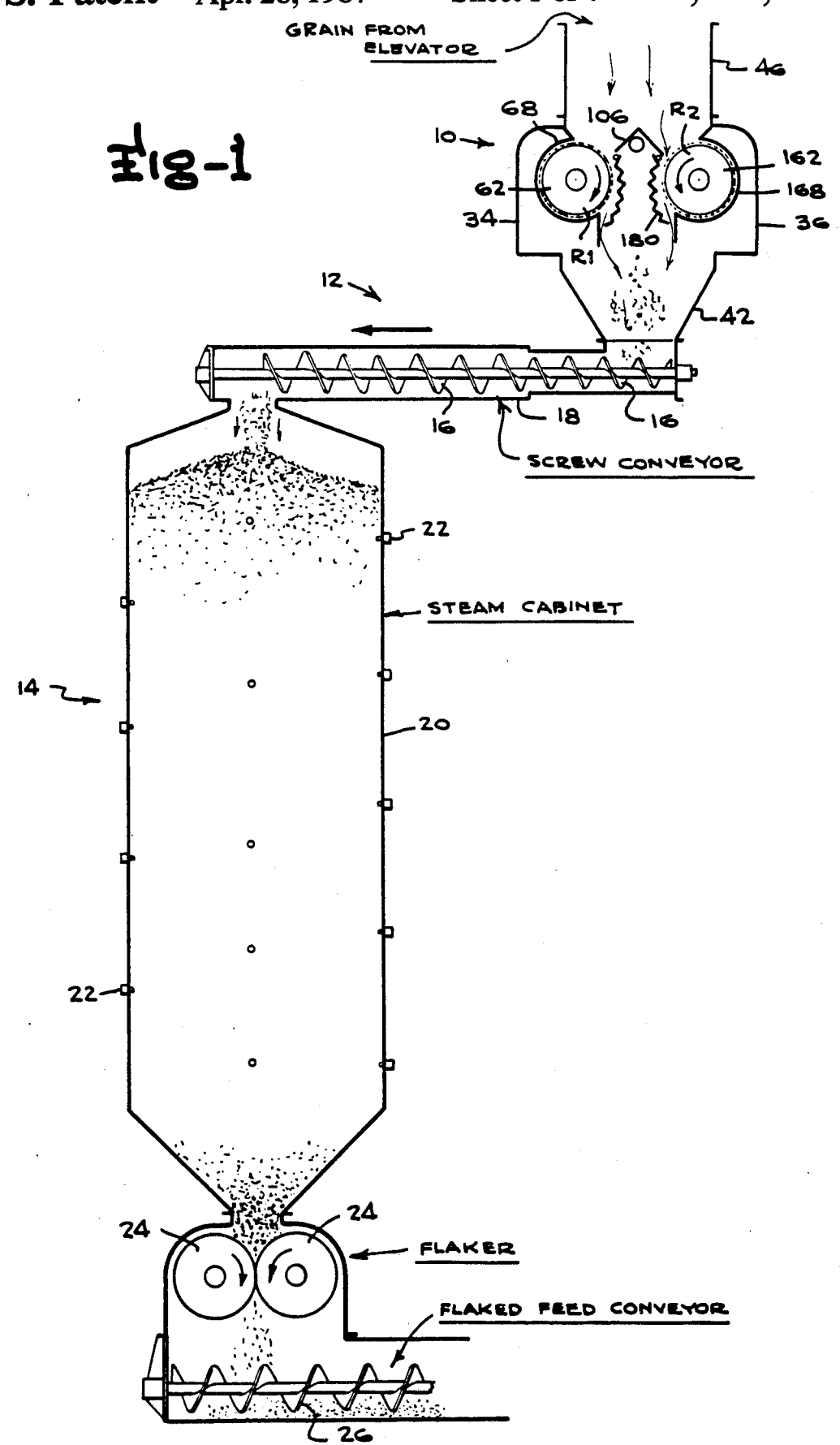
FIG. 1 is a side elevation bisecting sectional view of the grain scratcher-moisturizer apparatus of the preferred embodiment of the invention.

The preferred embodiment of the inventive combination comprises three primary elements as illustrated in FIG. 1. These elements consist of grain scratcher-moisturizer means 10, conveyor means 12 and steam flaker means 14. The conveyor means 12 and the steam flaker means 14 are of conventional construction whereas the grain scratcher-moisturizer means 10 is of totally unique construction. It should be observed that conveyor 12 includes a spiral auger 16 mounted in a housing 18 whereas the steam flaker 14 includes an elongated housing 20 having a plurality of steam inlets 22 with the housing receiving grain at its upper end which is treated by steam injected by injector means 22 and which grain is discharged downwardly between rollers 24 which compress the moisturized grain into flakes roughly similar to oatmeal in appearance and which flakes are fed outwardly by discharge conveyor means 26 for subsequent feeding to livestock.

The unique character of the invention resides in the fact that the grain scratching means 10 scratches the pericarp (waxy seed coat) of the grain and adds moisture to the grain which is then fed to the steam flaker 14 wherein further moisture is added to the grain. It has been found that this combination permits the addition of substantial quantities of moisture to the grain at a much faster rate than was previously the case. Since the power consumption does not go up in proportion to the increased flow rate, there is a substantial reduction in treatment cost for every ton of grain treated. Thus, a substantial improvement in the overall efficiency of the feed grain preparation process is achieved. Since the grain scratcher-moisturizer permits the processing of grain by the steam flaker at a faster rate, fewer or smaller steam flakers can be employed than would be the case without the grain scratcher.

Figure 2:
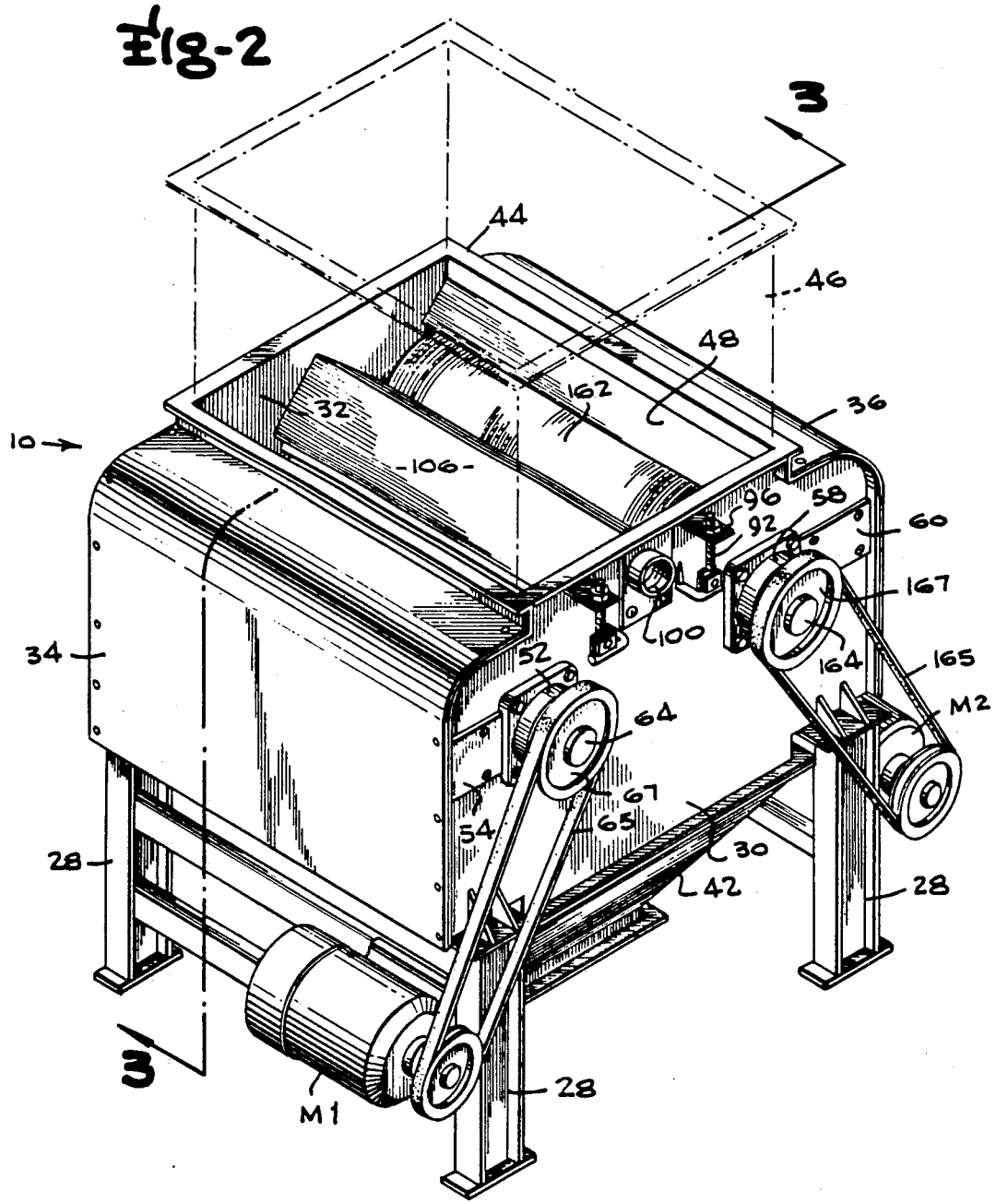
FIG. 2 is a perspective view of the preferred embodiment of the grain scratcher-moisturizer apparatus of the invention.

Turning now to FIGS. 2, 3, and 4, the grain scratcher-moisturizer apparatus 10 will now be discussed in detail. The apparatus comprises a housing supported on vertical pillar posts 28 and including a right end wall 30, and a left end wall 32. The end walls 30 and 32 have front edges to which a front cover shroud 34 is attached and rear edges to which a rear cover shroud 36 is attached. Additionally, the housing includes a floor plate 38 which has downwardly turned internal flanges 40 which define an opening communicating with a discharge hopper 42 to the lower end of which screw conveyor means 12 is connected as illustrated in phantom in FIG. 3. A rectangular frame 44 defines an infeed opening which is connectable to an infeed conduit or hopper 46, the nature of which will depend upon the particular installation. Grain fed into the housing is directed inwardly by canted guide plates 48.

Horizontally oriented front bearing mounting slots 50 extend inwardly from the forward or front edge of the right and left end walls 30 and 32 and provide support for front roller bearings 52 which slide inwardly from the forward edge of the slots and are held in position by retainer plates 54. Similarly, rear bearing mounting slots 56 extend forwardly from the rear edge portions of the right end wall and the left end wall and provide support for rear roller bearings 58 which are held in place by retainer plates 60.

A front roll R1 including an elongated cylindrical shell 62 and roll shaft 64 is supported for rotation by the front cylinder bearings 52 in which the ends of the roll shaft 64 are positioned. Similarly, a rear roll R2 includes a cylindrical shell 162 and a roll shaft 164 which is supported by the rear roll bearings 58. The roll members are driven in the direction of arrows 66 and 166 respectively by motors M1 and M2, belts 65 and 165 and drive sheaves 67 and 167 so that their inwardly facing surfaces are moving in a downward direction as will be apparent from inspection of FIG. 3. The front surface of cylindrical shell 62, which is moving upwardly, is enclosed by a roll shroud 68 to the lower end of which an outfeed grain guide 70 is connected. Similarly, the rear roll is provided with a rear roll shroud 168 to the lower end of which a rear outfeed grain guide 170 is connected.

The cylindrical shells 62 and 162 are 31 inches long and are of identical construction which is illustrated in FIGS. 6 and 7. More specifically, a spiral groove 72 extends about the periphery of each of the cylindrical shells and receives a saw blade comprising a base portion 74 fitted in the spiral groove 72 with a plurality of canted V-shaped teeth 76 extending outwardly from the base portion 74. The teeth 76 are canted in the direction of movement of their respective roll members and each have a sharp outer end portion 78 as best shown in FIG. 6. Adjacent convolutions of the spiral groove 74 are closely spaced at a distance of approximately 1/7 inch apart. Thus, the teeth of each convolution of the saw member are closely adjacent the teeth of the next convolution.

A first deflector element 80 is positioned adjacent and facing the cylindrical shell 62 whereas a second deflector member 180 is similarly positioned and facing the second cylindrical shell 162. Deflector element 80 is supported by a pivot rod 82 extending between the right end wall 30 and the left end wall 32. Similarly, deflector element 180 is supported for pivotal adjustable movement by a pivot rod 182 similarly extending between the end walls 30 and 32. FIG. 5 illustrates the manner in which pivot shaft 82 can be rotatably adjusted to vary the spacing of the deflector element 80 from the surface of the cylindrical shell 62 and its associated teeth. More specifically, a transverse outer arm 84 has tabs 86 through which a pivot pin 88 extends with pin 88 being fixedly attached to a plate 90 welded to the lower end of a threaded rod 92. The upper end of threaded rod 92 is supported by nuts 94 on opposite sides of a fixed support tab 96 extending outwardly and welded to the end wall 30. It will consequently be apparent that adjustment of the nut members 94 will result in upward or downward movement of the threaded rod 92 which will consequently be translated into rotational movement of shaft 82 and its associated grain deflector element 80. The lower end of deflector 80 can be moved against outfeed grain guide 70 to completely cut off the flow of grain past roll R1. Pivot shaft 82 supporting the rear grain deflector element 180 is similarly mounted to permit adjustment as shown by the solid and phantom line positions of FIG. 3.

A spray pipe 100 extends the length of the space between the end walls 30 and 32 and includes a plurality of downwardly facing spray openings 102 so that liquid fed to the spray pipe 100 is sprayed downwardly in the space between the deflector elements 80 and 180 and strikes the scratched grain as it flows toward conveyor 12. An angle member 106 also extends the length of the space between the end walls 30 and 32 and provides protection for the spray pipe 100 from the force of grain being downwardly fed into the apparatus by means 46 or the like.

In use, motor means M1 and M2 are actuated to drive the rolls in the direction illustrated by the arrows 66 and 166 and grain is fed downwardly into the apparatus so that it strikes the teeth 76 of each of the roll members. The rolls have a diameter of 12 inches and are driven at approximately 1080 rpm so that their surface velocity is approximately 3393 feet per minute. This velocity is rather critical since slower or faster speeds have been found to produce inferior results. The grain is consequently hurled by the teeth of each of the roll members into the associated deflector members 80, 180. The deflector members 80 and 180 consist of a plurality of elongated planar portions each of a length approximately the same length as the cylindrical shell member 62, 162 with each of the planar components 82a, 82b being oriented approximately perpendicularly to a tangent from the cylindrical shell member so that the grain is hurled against the planar strip portions and immediately bounces back into contact with the teeth of the associated roll. It has been found that the grain consequently moves back and forth between the deflector and the associated teeth of the cylinder several times so that the majority of the grain is effectively scratched through its husk at several locations. As the rate of feed is increased, the percentage of grain that is scratched is reduced; for example, at a maximum feed rate of 30 tons per hour, 74% of the grain is scratched. The grain moves downwardly as it ricochets backwards and forth between the teeth of the associated roll and the deflector means and eventually passes through the space 71 between the lower end of deflector element 80 and the outfeed grain guide 70 and similarly through space 171 between elements 180 and 170. The grain then receives a spray of moisture from spray pipe 100 and flows into the discharge hopper 42 from which it is conveyed by the conveyor means 12 which stirs the grain and causes moisture absorption as it conveys it to the upper end of the steam flaker 14. In a typical operation, the grain supplied to the scratcher apparatus will have a moisture content of 11% to 14% and will increase its moisture content 6% to 8% as it moves through the scratching machine 10 and conveyor 12.

The grain moves downwardly through the steam flaker during which process it is subjected to steam provided through injectors 22 and absorbs additional moisture to increase its moisture content an additional 2% to 4% before it is discharged between the pressure rollers 24 onto conveyor 26. Thus, the grain is moisturized both in the scratcher apparatus 10 and in the steam flaker 14. It has been found that the combination provides a substantially greater moisture input to the grain which reduces the power required for rollers 24 so that each kilowatt of power employed is adequate to treat a larger quantity of grain as compared to previous grain feed moisturizing and flaking systems. Also, the increased moisture content results in less wear on the rollers and they will require resurfacing less frequently.

The savings achieved by the present invention are dramatically emphasized by the fact that the power cost per ton of milo for the present invention is $3.20 as compared with $5.50 for a conventional steam flaker. Moreover, substantial labor savings are also possible due to the faster rate of operation permitted by the present invention. Similar savings are available when using corn or other grain.

While numerous modifications of the preferred embodiment of the invention will undoubtedly occur to those of skill in the art, it should be understood that the spirit and scope of the invention is to be limited solely by the appended claims.

I claim:

1. A method of treating whole grain comprising the steps of:

scratching the outer surface of said grain by reverberating the grain a plurality of times between a fixed deflector and a rotating roll having scratching protrusions on its surface, said roll being rotated at a speed giving it a surface velocity of approximately 3393 feet per minute;

subsequently spraying moisture onto the scratched grain;

feeding said scratched grain into the inlet of a steam cabinet;

operating the steam cabinet to heat and further mositurize the scratched grain; and feeding the heated and moisturized grain from the steam cabinet between rollers to compress the grain into flakes.

2. The method of claim 1 wherein the grain is milo.

3. The method of claim 1 wherein the grain is corn.

4. The method of claim 1 wherein said scratching protrusions are V-shaped teeth.

5. The method of claim 4 wherein the grain initially has a moisture content of 11% to 14% and the moisture content of the grain is increased 6% to 8% prior to the feeding of the grain into the inlet of the steam cabinet.

6. The method of claim 5 wherein the grain increases its moisture content an additional 2% to 4% while in the steam cabinet.

7. The method of claim 6 wherein the grain is milo.

8. The method of claim 6 wherein the grain is corn.

9. The method of claim 1 wherein the grain initially has a moisture content of 11% to 14% and the moisture content of the grain is increased 6% to 8% prior to the feeding of the grain into the inlet of the steam cabinet.

10. The method of claim 9 wherein the grain increases its moisture content an additional 2% to 4% while in the steam cabinet.

11. The method of claim 10 wherein the grain is corn.

12. The method of claim 10 wherein the grain is milo.

13. The method of claim 9 wherein said scratching protrusions are U-shaped teeth.

14. The method of claim 13 wherein the grain increases its moisture content an additional 2% to 4% while in the steam cabinet.

* * * * *